United States Patent [19]

Montorefano

[11] Patent Number: 4,660,136
[45] Date of Patent: Apr. 21, 1987

[54] SINGLE REGULATION POWER SUPPLY WITH LOAD COMPENSATION OF AN AUXILIARY VOLTAGE OUTPUT

[75] Inventor: Gianpaolo Montorefano, Milan, Italy
[73] Assignee: Honeywell Inc., Minneapolis, Minn.
[21] Appl. No.: 820,768
[22] Filed: Jan. 21, 1986
[30] Foreign Application Priority Data
   Jan. 24, 1985 [EP] European Pat. Off. ........ 85100687.4
[51] Int. Cl.[4] ...................... H02M 3/315; G05F 1/44
[52] U.S. Cl. ........................................ 363/26; 363/97; 323/267
[58] Field of Search ................. 363/15, 17, 18, 20-26, 363/41, 50, 55, 56, 58, 67, 74, 79, 86, 89, 95, 100, 131-134, 97; 323/265-267

[56] References Cited

U.S. PATENT DOCUMENTS

| | | | |
|---|---|---|---|
| 4,122,514 | 10/1978 | Amin | 363/21 |
| 4,419,723 | 12/1983 | Wilson, Jr. | 323/267 X |
| 4,525,774 | 6/1985 | Kino et al. | 363/17 |
| 4,581,691 | 4/1986 | Hock | 363/21 |

Primary Examiner—Patrick R. Salce
Assistant Examiner—Emanuel Todd Voeltz
Attorney, Agent, or Firm—Elbinger, Lewis P.

[57] ABSTRACT

A single regulation power supply providing load compensation of an auxiliary voltage output, wherein power is transferred from the primary winding of a transformer to a first and a second secondary windings each coupled to a rectifying and filter network respectively providing a main and an auxiliary voltage output, wherein a control loop senses the algebraic sum of the main output voltage and the voltage drop developed in a resistor by current drawn by a load on the auxiliary voltage output and controls current pulses applied to the primary winding so as to keep constant such sum, thereby rendering the auxiliary voltage insensitive to load changes at the auxiliary output, to any desired extent determined by the value of such resistor, with the trade off of a limited degradation in the control of the main voltage output.

2 Claims, 6 Drawing Figures

SINGLE REGULATION POWER SUPPLY WITH LOAD COMPENSATION OF AN AUXILIARY VOLTAGE OUTPUT

BACKGROUND OF THE INVENTION

The present invention relates to a single regulation power supply with load compensation of an auxiliary voltage output.

Multiple output power supplies are well known and widely used in the electronic industry.

The most sophisticated and expensive of these prior art power supplies provide independent regulation of each output; in other cases they provide precise voltage regulation of the main output, but with some consequential regulation effects on auxiliary outputs, and further provide post regulation circuits for the auxiliary outputs to achieve the desired regulation level.

In several instances, it is necessary to limit the cost of these power supplies; to this end voltage regulation is provided for only the main output and no post regulation is provided for the auxiliary outputs.

In order to minimize "cross regulation" (a deceptive term which indicates more than regulation), the variations caused in an auxiliary unregulated output by load variation of the main regulated output, an arrangement is often used in which an auxiliary voltage of an auxiliary output is generated as the sum of the regulated main voltage output and an unregulated secondary voltage output.

In this manner, a fraction of the auxiliary voltage is precisely regulated and unaffected by load changes in the main or auxiliary outputs, and "cross regulation" is reduced at some extent.

An example of such multiple output power supplies is discussed in the article "A Multiple Output Converter with Load Compensated Gain to Achieve Stability Under Light or No Loading Conditions" by K. H. Kuster, published in Intelec, International Telecommunication Energy Conference, Washington, D.C. U.S.A., 3-6 Oct. 1982, pp. 125-130.

Nevertheless, the effect of load changes in the auxiliary outputs of these prior art power supplies appears to be unavoidable unless some form of post regulation is utilized with the main output regulation.

OBJECTS OF THE INVENTION

Accordingly, it is the principal object of the invention to provide an improved power supply.

Another object of the invention is to provide a power supply in which the auxiliary output is compensated for load current variations.

SUMMARY OF THE INVENTION

The present invention overcomes the aforementioned problems and limitations of these prior art devices by providing a very simple and inexpensive means to achieve load compensation of an unregulated auxiliary output, through regulation of the main output voltage, but with the trade off of a slight and generally acceptable degradation of the main output voltage regulation characteristic. This result is achieved in a single regulation power supply of the converter type which has a main regulated output and a secondary unregulated output, series-connected to the main output to provide an auxiliary output voltage by the insertion of a resistor in the regulation loop of the main output, through which resistor flows the load current of the auxiliary output. The value of such resistor bears a preestablished relationship to the internal resistance of the main output voltage generator and the secondary output voltage generator. The regulation loop controls the sum of the voltage at the main output and the voltage drop across such resistor, keeping the sum voltage constant.

The voltage at the main output differs from the regulated voltage by the small amount of voltage drop across the resistor, and good regulation characteristics are maintained.

BRIEF DESCRIPTION OF THE DRAWINGS

These and other features of the invention, together with the advantages deriving therefrom, will become apparent from the following description of the invention and from the accompanying drawings, wherein.

DESCRIPTION OF THE PREFERRED EMBODIMENTS

Figure 1:
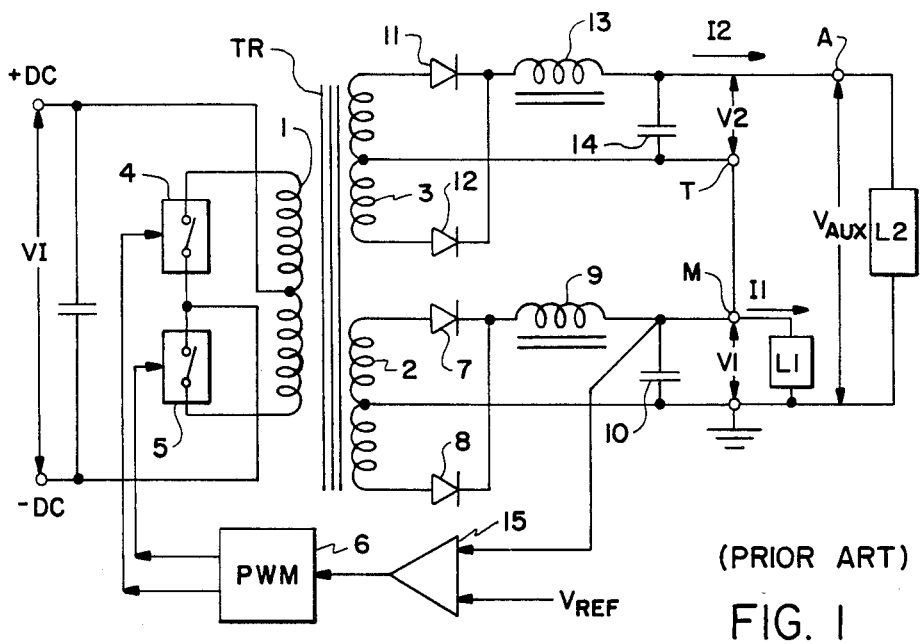
FIG. 1 is a circuit diagram of a prior art power supply.

FIG. 1 is a simplified circuit diagram of a power supply of the converter type which has two outputs.

The power supply comprises a transformer TR having a center tapped primary winding 1, a center tapped main secondary winding 2 and a center tapped auxiliary secondary winding 3.

The center tap of primary winding 1 is connected to a +DC terminal. The ends of primary winding 1 are connected to a −DC terminal through respective switches 4 and 5.

The center tap of secondary winding 2 is connected to ground and the ends thereof are connected through respective diodes 7 and 8 and a common inductor 9 to a main output terminal M.

A capacitor 10 is connected between terminal M and ground. The center tap T of secondary winding 3 is connected to main output terminal M.

The ends of secondary winding 3 are connected through respective diodes 11 and 12 and a common inductor 13 to an auxiliary output terminal A.

A capacitor 14 is connected between terminal A and terminal M. An unregulated DC input voltage VI is applied between the input terminals +DC, −DC.

The two switches 4 and 5 are controlled by a pulse width modulator 6 to close alternately, thus allowing an energizing current to flow alternately in each of the half of the primary winding during cycles of controlled duration. The alternating voltage pulses induced in secondary winding 2 are rectified by diodes 7 and 8 and filtered by LC network 9 and 10, to provide a main output voltage $V_1$ between terminal M and ground.

Terminal M is connected to a signal input terminal of an error amplifier 15, which receives a reference voltage level $V_{REF}$ at a reference input. The error amplifier 15 provides an error signal to a control input of pulse width modulator 6, which in turn controls the time closed, time open intervals of switches 4 and 5 so as to maintain $V_1$ very close to the reference voltage $V_{REF}$ and practically constant, irrespective of voltage changes in the input voltage VI or changes in the main load $L_1$ connected to output terminal M.

The alternating voltage pulses induced in secondary winding 3 are rectified by diodes 11 and 12, and filtered by LC network 13 and 14, to provide a secondary output voltage $V_2$ between terminal A and terminal M. An auxiliary voltage $V_{AUX}$ is available between terminal A and ground to supply a second load $L_2$.

The auxiliary voltage $V_{AUX}$ has the following peculiarity. It is the sum of $V_1$, which is a regulated voltage, and $V_2$. Therefore, that portion of $V_{AUX}$ which is represented by $V_1$, is unaffected by voltage changes of VI, nor by changes of loads $L_1$ or $L_2$. Further, that portion of $V_{AUX}$ which is represented by $V_2$ is also unaffected by VI changes, which are compensated for by the regulation loop to the advantage of $V_2$ also.

This peculiarity is well known to those skilled in the art and is further explained in analytical terms, by the above mentioned article.

Despite this remarkable advantage, the power supply of FIG. 1 has the limitation that $V_2$, and hence $V_{AUX}$, is affected by load changes at both the main output terminal M as well as at the auxiliary output terminal A.

Figure 2:
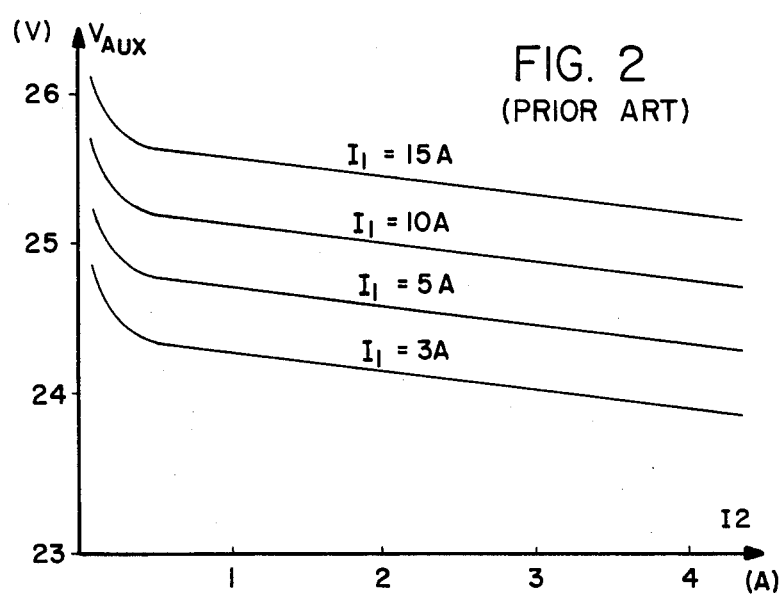
FIG. 2 is a diagram illustrating the relationship between the voltage of the auxiliary output and the load current in the power supply of FIG. 1.

By way of example, FIG. 2 shows a typical family of curves, expressing $V_{AUX}$ (hence $V_2$) as a function of the current $I_1$ (taken as parameter) drawn by the main load $L_1$, and of the current $I_2$ drawn by the load $L_2$ at the auxiliary output terminal. Such a power supply is designed to provide a main output, regulated voltage of +5 V within a load current $I_1$ range of from 3 to 15 amperes and an auxiliary output voltage, nominally 25 V, within a load current $I_2$ range of from 0.5 to 4 Amperes.

Figure 3:
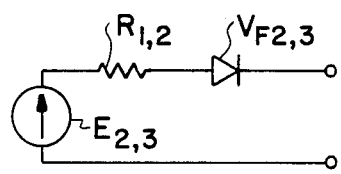
FIG. 3 is an equivalent circuit diagram for the output stages of the power supply of FIG. 1.

A similar family of curves may be illustrated wherein $V_{AUX}$ is expressed as a function of load current $I_1$, and load current $I_2$ is taken as parameter. Such curves indicate that in the operating range defined above, $V_{AUX}$ is a linear function of current $I_1$ and $I_2$, which confirms the theoretical approach explained in the above mentioned article, that each of the output stages of the power supply shown in FIG. 1 may be represented by the equivalent circuit shown in FIG. 3.

Each of secondary windings 2 and 3 acts as a perfect voltage generator $E_{2,3}$. Each diode acts as a fixed voltage drop $V_{F2,3}$ (the respective forward voltage drop of each diode).

The combined resistive component of respective ones of secondary windings 2 and 3 and inductors 9 and 13 act as respective resistors $R_1$ and $R_2$.

It is to be noted that in the operating range of the power supply there is a continuous current flowing through the secondary winding, the diodes and the inductors, with an average value equal to the output current drain from the circuit, and with a minimum ripple about such value. However, this is not true for very low or no load currents, which is the reason for the non-linear dependence of $V_{AUX}$ on currents $I_1$ and $I_2$, when the value of such currents is close to zero.

The indices 2 and 3 appended to the components of the equivalent circuit relate these components to the main output stage (index 2) or to the secondary output stage (index 3).

Although there is a relationship between the input voltage VI and each of the induced electromotive forces $E_2$ and $E_3$, which is described in the above mentioned article, such a relationship is not material to the subject invention. More importantly, however, there is also a fixed relationship between $E_2$ and $E_3$, namely $$E_2/E_3 = N_2/N_3$$

where $N_2/N_3$ is the turn ratio of winding 2 to winding 3.

These considerations are useful for an understanding the heart of the invention.

Figure 4:
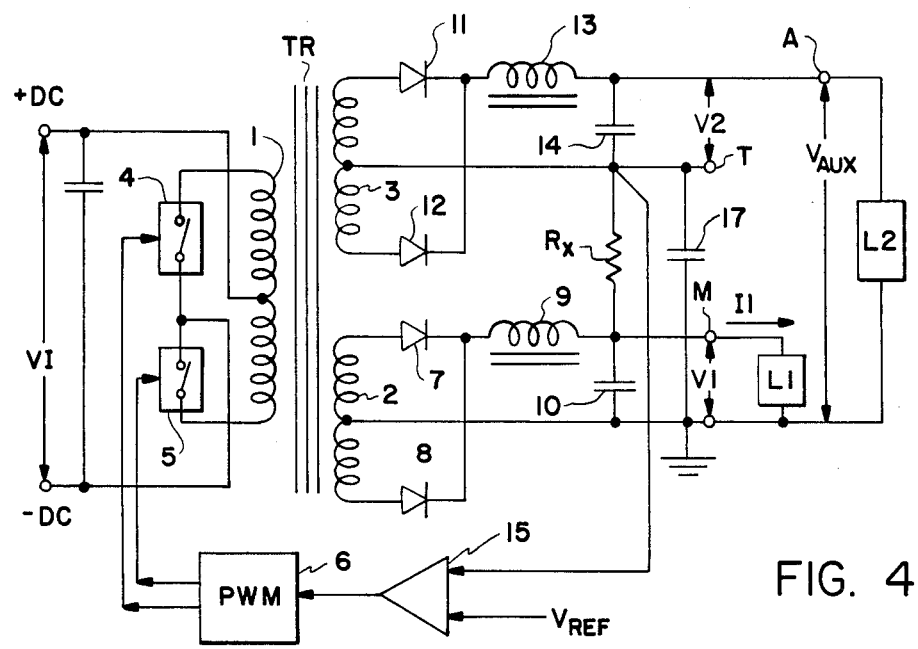
FIG. 4 is a circuit diagram of the preferred embodiment of the invention, which is a modified form of the power supply of FIG. 1.

In accordance with the invention, the embodiment of FIG. 4 is a modified form of the power supply of FIG. 1. Because the modification is minimal, the complete structure of the power supply will not be described again. Like reference numerals relate the elements of FIG. 4 to the equivalent elements of FIG. 1.

The circuit of FIG. 4 differs from that of FIG. 1 principally in that center tap T of secondary winding 3 is connected to output terminal M of the main output stage through a resistor $R_X$ and in that the signal input terminal of error amplifier 15 is connected to center tap T instead of terminal M.

By this arrangement regulation is not performed on the main output voltage $V_1$ but instead, on a voltage which differs from the main output voltage by the voltage drop VD occurring across resistor $R_X$, given by $$VD = R_X I_2$$

where $I_2$ is the load current at auxiliary output terminal A. By this arrangement and with an appropriate selection of the values of resistor $R_X$, the level of auxiliary voltage $V_{AUX}$ can be rendered completely independent of the value of current $I_2$.

Figure 5:
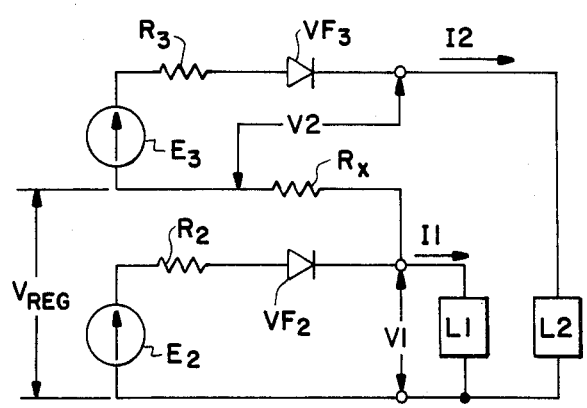
FIG. 5 is an equivalent circuit diagram of the output stages of the power supply of FIG. 4.

FIG. 5 is an equivalent circuit diagram of the embodiment of the output stages of the circuit of FIG. 4, which can be readily derived from the considerations previously developed. From this circuit, where the regulated voltage is $V_{REG}$ instead of $V_1$:

$$V_1 - R_X I_2 = V_{REG} = \text{Constant} \tag{1}$$

$$V_1 = E_2 - R_2(I_1 + I_2) - V_{F2} \tag{2}$$

$$V_2 = E_3 - R_3 I_2 - V_{F3} \tag{3}$$

$$V_{AUX} = V_{REG} + V_2 \tag{4}$$

Using this relationship $E_2/E_3 = N_2/N_3$ and equation (2) to express $E_2$, $E_3$ in equation (3) may be expressed as:

$$V_2 = N_3/N_2(V_1 + R_2(I_1 + I_2) + V_{F2}) - R_3 I_2 - V_{F3} \tag{5}$$

Therefore $$V_{AUX} = V_{REG} + N_3/N_2(V_1 + R_2(I_1 + I_2) + V_{F2}) - R_3 I_2 - V_{F3} \tag{6}$$

By substituting for $V_1$ from equation (1), equation (6) becomes:

$$V_{AUX} = V_{REG} + N_3/N_2)V_{REG} + R_X I_2 + R_2)I_1 + I_2) + V_{F2}) - R_3 I_2 - V_{F3} \tag{7}$$

In equation 7, ($V_{REG}$, $V_{F2}$ AND $V_{F3}$) are constant, so that $V_{AUX}$ is clearly dependent only on $I_1$ and $I_2$.

In order to have $V_{AUX}$ independent of $I_2$, it is sufficient that:

$$N_3/N_2(R_X+R_2)-R_3=0$$

or $$R_X=(N_2/N_3)R_3-R_2 \qquad (8)$$

Equation (8) shows that for a value of $R_2=N_2/N_3R_3$ the value of $R_X$ may be set equal to 0.

In this case, the power supply is inherently compensated for auxiliary output load changes.

Unfortunately, a transformer and inductor of a size to meet this requirement is generally feasible only to the detriment of the power supply efficiency, and involves severe losses in the main output winding. Therefore, the use of the additional resistor $R_X$ is the only practical way to achieve the desired result.

Clearly, this result is achieved with the trade off of some degradation in the regulation characteristics of the main output voltage, which degradation is, however, acceptable because $R_X$ practically can have a value in the order of only tenths of a million.

Additionally, the arrangement does not provide compensation for main output load changes. Nevertheless, the arrangement is particularly useful in all instances in which the main load current is substantially constant, while the auxiliary output load current is varied widely.

Several kinds of electronic equipments require this type of power supply; for example in which a fixed power drained is necessary for powering logical components (such as at a voltage of +5 V) while a variable power at higher voltage of +12 V to +25 V is required to intermittently energize electro-mechanical devices.

A typical example may be found in electronic printers and personal EDP systems, such systems may require the powering of logical circuits at +5 V with substantially consistent load current of 10 amp, whereas the energization of the print head, and printer motors may require powering at +25 V with load current varying between 1 to 4 Amp.

A power supply designed according to the diagram of FIG. 4, in order to achieve high efficiency, gives preference to the size of the main output winding and filter, against the size of the auxiliary winding. This may lead to a value of $R_2=30$ m$\Omega$ against a value of $R_3=250$ m$\Omega$, with $N_2/N_3=6/21$, whereby $R_X$ must be selected to have value $$R_X=6/21\times250-30\approx41.5M$$

This means that the level of $V_1$ is affected by load changes at the auxiliary output by no more than $R_X(I_{2MAX}-I_{2MIN})=41.5\times3=124.5$ mV. In a conventional power supply of the type shown in FIG. 1, the above specified sizes of the windings would have been resulted in $V_1=V_{REG}=$Constant, but the level of $V_2$ would have been affected by load changes at the auxiliary output, in the much larger amount of about 430 mV.

It is clear that in order to minimize voltage changes of both $V_1$, as well as $V_2$, and to confine these changes to the same percentage range, or any preestablished ratio thereof, a partial compensation may be adopted. For instance, considering the same numerical values as the preceding example, $R_X$ may be selected to have a value of 17 m, by which changes of $V_1$ are contained within 51 mV (1% of 5 V), and changes of $V_2$ are contained within 246 mV (1% of 25 V).

Figure 6:
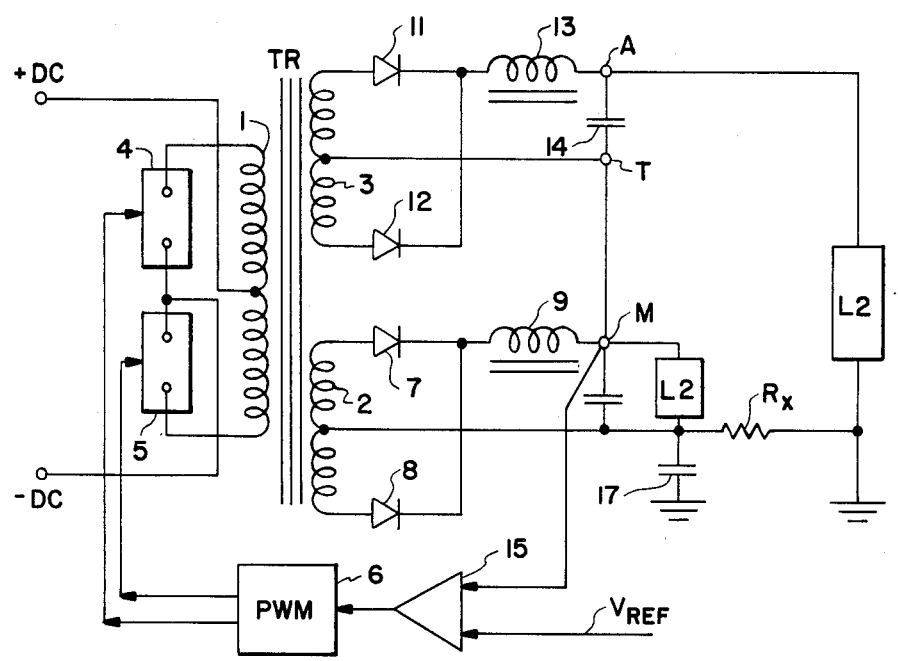
FIG. 6 is a circuit diagram of an alternative embodiment of the invention.

Although FIG. 4 shows a preferred embodiment of the invention, several changes can be made therein without departing from the scope of the invention. Thus, the embodiment of FIG. 4 provides a common ground level for both the main output as well as the auxiliary output. If there is no such requirement, the embodiment may be modified as shown in FIG. 6, where resistor $R_X$ is shown to be connected to the ground side of the auxiliary output, instead of the connection point between main output stage and secondary output stage.

This latter arrangement shows that the auxiliary output stage needs not to be series connected with the main output stage and, therefore, can provide an auxiliary output voltage independent of the main output voltage.

Moreover, while the power supply has been shown as a full wave converter, it may take the form of a half wave converter, and while the windings have been shown as center tapped, they may be single windings provided with suitable rectifying bridges at the output, and suitable driving circuits at the input.

Any combination thereof is obviously also feasible. Further, the turnon/turnoff ratio of the energizing pulse may be changed, for regulation purposes, by means of either pulse width modulation circuits or frequency modulation circuits.

In conclusion, the heart of the invention resides, for a power supply converter wherein pulses applied to the input winding of a transformer induce pulses in winding of a main output section and in a winding of an auxiliary output section, the voltage at the main output being regulated through a control loop which senses the voltage at the main output to control the pulsed energization of the power supply, in the inclusion in the control loop of a resistor for sensing the load current at the auxiliary output, the voltage drop across said resistor being algebraically added to the main output voltage.

A small capacitor 17 is preferably added in parallel to resistor $R_X$ (or between tap T and ground, as shown in FIG. 4) for the purpose of achieving stability of the control loop and rendering it insensitive to sudden changes in the auxiliary output load $L_2$.

I claim:

1. A single regulation power supply providing load compensation of an auxiliary voltage output, wherein, power is transferred from a primary winding of a transformer to first and second secondary windings, the secondary windings being respectively connected to a first and a second rectifying and filter network respectively providing a first and a second DC voltage source, comprising:

a resistor connected to one terminal of each of said sources to connect said sources in series;

a main load connected across said first source;

an auxiliary load connected between the terminals of each source opposite the terminal of said source connected to said resistor; and a control loop for sensing a voltage and responsive thereto to control current pulses supplied to said primary winding to maintain the voltage sensed thereby at a preestablished level, said control loop being connected across said resistor and said first source to sense the algebraic sum of the voltage of said source and the voltage drop across said resistor.

2. A single regulation power supply providing load compensation of an auxiliary voltage output, wherein, power is transferred from a primary winding of a transformer to first and second secondary windings, the secondary windings being respectively connected to a first and a second rectifying and filter network respectively providing at a first and a second output terminal a first and a second DC voltage, a control loop sensing said first DC voltage and controlling current pulses supplied to said primary winding so as to keep said first DC voltage a pre-established level, characterized in that said power supply comprises a resistor, through which flows the current drawn from said second output terminal and wherein said control loop senses the algebraic sum of said first DC voltage and the voltage drop across said resistor, wherein said resistor has a value R not greater than $(N_2/N_3)R_3 - R_2$ where $N_2/N_3$ is the turns ratio of said first and second secondary windings and $R_2$ and $R_3$ are the respective equivalent resistances of said first and second secondary windings and associated filter networks.

* * * * *